United States Patent
Marthaler

Patent Number: 5,988,265
Date of Patent: Nov. 23, 1999

[54] FUEL COOLER AND COOLANT FILTER ASSEMBLY

[75] Inventor: Michael J. Marthaler, Columbus, Ind.

[73] Assignee: Cummins Engine Company, Inc., Columbus, Ind.

[21] Appl. No.: 09/024,726

[22] Filed: Feb. 17, 1998

[51] Int. Cl.⁶ ....................................................... F01P 3/00
[52] U.S. Cl. ........................... 165/51; 165/916; 165/103; 165/109; 165/119; 123/41.31; 123/541; 123/196 AB; 123/196 R; 184/104.1; 184/104.3; 251/317; 210/185; 210/178; 210/183
[58] Field of Search ............................... 165/51, 916, 119, 165/103, 109; 123/41.31, 541, 196 AB, 196 R; 251/317; 210/184, 185, 177, 178, 183; 184/104.1, 104.2, 104.3

[56] References Cited

U.S. PATENT DOCUMENTS

| | | |
|---|---|---|
| 1,084,131 | 1/1914 | Clark . |
| 2,834,469 | 5/1958 | Mitterer ................................... 123/541 |
| 3,083,833 | 4/1963 | Kasten ..................................... 165/119 |
| 3,097,165 | 7/1963 | Kasten ..................................... 165/119 |
| 4,036,182 | 7/1977 | Gandy ..................................... 123/541 |
| 4,036,188 | 7/1977 | Sami et al. ................................ 165/51 |
| 4,324,213 | 4/1982 | Kasting et al. ........................... 165/51 |
| 4,333,516 | 6/1982 | Krueger et al. . |
| 4,367,717 | 1/1983 | Ray ......................................... 165/51 |
| 4,423,708 | 1/1984 | Sweetland ................................ 165/51 |
| 4,426,965 | 1/1984 | Patel . |
| 4,669,533 | 6/1987 | Hehl ........................................ 165/119 |
| 4,715,434 | 12/1987 | Rudavicius . |
| 4,759,401 | 7/1988 | Pfouts et al. .............................. 165/51 |
| 4,782,891 | 11/1988 | Cheadle et al. . |
| 4,878,536 | 11/1989 | Stenlund .................................. 165/119 |
| 4,898,141 | 2/1990 | Fiedler .................................... 123/541 |
| 5,024,268 | 6/1991 | Cheadle et al. . |
| 5,435,346 | 7/1995 | Tregidgo et al. ......................... 165/119 |

*Primary Examiner*—Ira S. Lazarus
*Assistant Examiner*—Terrell McKinnon
*Attorney, Agent, or Firm*—Woodard, Emhardt, Naughton, Moriarty & McNett

[57] ABSTRACT

A fuel cooler and coolant filter assembly for the filtering of coolant and the cooling of a fuel flow for use in connection with a cylinder head of a vehicle engine includes three primary components which are assembled to one another in a stacked configuration and which in turn are assembled to the cylinder head. These three primary components include a fuel cooler core which is assembled directly to the cylinder head and which includes a fuel inlet, a fuel outlet, and a heat exchanger. The interior of the fuel cooler core is designed for the incoming fuel to flow and circulate across the exterior of the heat exchanger prior to exiting. The second primary component includes a filter head assembly with various inlets, outlets, and passageways. The filter head assembly is attached directly to the fuel cooler core so as to deliver coolant into the heat exchanger. The third component is a coolant filter which is connected to the filter head assembly and which filters the flow of coolant from the filter head assembly and then introduces the coolant back into the filter head assembly. A shut off valve is positioned in the filter head assembly so as to block the flow of coolant from the coolant filter, allowing the coolant filter to be replaced without the loss of coolant. A by-pass passageway ensures that coolant continues to flow to the heat exchanger, even when the shut off valve is in a closed condition.

24 Claims, 9 Drawing Sheets

FUEL COOLER AND COOLANT FILTER ASSEMBLY

BACKGROUND OF THE INVENTION

The present invention relates in general to fluid filtering devices and fluid filtering systems associated with automotive/diesel truck engines. More specifically the present invention pertains to a filter head for a water filter (corrosion resistor element) assembly which contains a supplemental coolant additive (SCA). The filter head is constructed and arranged to control the flow of water therethrough and into and from the water filter. A cooler core is assembled between the cylinder head and the filter head such that the combination functions as a fuel cooler. The necessary flow passageways are provided for fuel and water to circulate as required for fuel cooling.

In the design of diesel truck engines a supplemental coolant additive (SCA) is often used to provide or introduce a corrosion inhibitor into the engine coolant. The point of addition of the SCA is subsequent to flow through the radiator. Consequently, the point of SCA introduction is at a location when the coolant is likely at its lowest temperature relative to the coolant flow loop.

If there is a desire to cool the fuel before introduction into the cylinders, typically by way of fuel injection, a cooling location within the engine needs to be provided. One option is to establish a heat exchanger for heat transfer between the fuel and some other fluid source such as the coolant. One reason to lower the fuel temperature is to be able to provide a more uniform and consistent fuel temperature which may be desirable in order to control emissions. Another reason is to be able to provide a fuel of lower temperature for more efficient engine operation at high load conditions.

In the present invention the fuel cooling function is combined with the addition of a corrosion inhibitor by means of a novel fuel cooler/water filter assembly. The present invention provides a fuel cooler mount that provides passages for coolant/water flow, and the mounting for a corrosion resistor element. A manual flow valve is incorporated in order to shut off the flow of coolant/water to the corrosion resistor element to allow for its replacement as required.

In the event that a fuel cooling function is not required in a particular engine or installation, the cooler core assembly can be omitted and the filter head is then bolted directly to the cylinder head. The water filter remains assembled to the filter head. This is an important feature of the present invention.

Although the specific structural features of the present invention are novel and unobvious, at least one oil cooler and filter combination has been conceived of, as well as various filtering arrangements. In some of these filtering arrangements a corrosion inhibitor is employed. These two examples of other structures are but a sampling of earlier design efforts. The following listing of earlier patents is a more complete sampling of these earlier design efforts:

| U.S. Pat. No. | PATENTEE | ISSUE DATE |
| --- | --- | --- |
| 4,715,434 | Rudavicius | Dec. 29, 1987 |
| 1,084,131 | Clark | Jan. 13, 1914 |
| 4,423,708 | Sweetland | Jan. 3, 1984 |
| 4,426,965 | Patel | Jan. 24, 1984 |
| 4,333,516 | Krueger et al. | Jun. 8, 1982 |
| 4,782,891 | Cheadle et al. | Nov. 8, 1988 |
| 5,024,268 | Cheadle et al. | Jun. 18, 1991 |

While a variety of features are disclosed by the listed references, the present invention is novel and unobvious.

SUMMARY OF THE INVENTION

A fuel cooler and coolant filter assembly for connection to a cylinder head of a vehicle engine for the filtering of coolant and the cooling of a fuel flow by the coolant according to one embodiment of the present invention comprises a filter head assembly constructed and arranged with a first coolant passageway with a first coolant inlet and a first coolant outlet and a second coolant passageway with a second coolant inlet and a second coolant outlet, a coolant filter connected to the filter head assembly, the first coolant outlet cooperatively arranged with the coolant filter for delivering coolant into the coolant filter and the second coolant inlet cooperatively arranged with the coolant filter for receiving coolant from the coolant filter, and a fuel cooler core connected to the filter head assembly and including a fuel inlet, a fuel outlet, and a heat exchanger, the second coolant outlet being cooperatively arranged with the fuel cooler core for delivering coolant to the heat exchanger, the heat exchanger having a flow outlet for coolant and being positioned within the fuel cooler core whereby fuel flows across the heat exchanger.

One object of the present invention is to provide an improved fuel cooler and water filter head assembly.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 13:
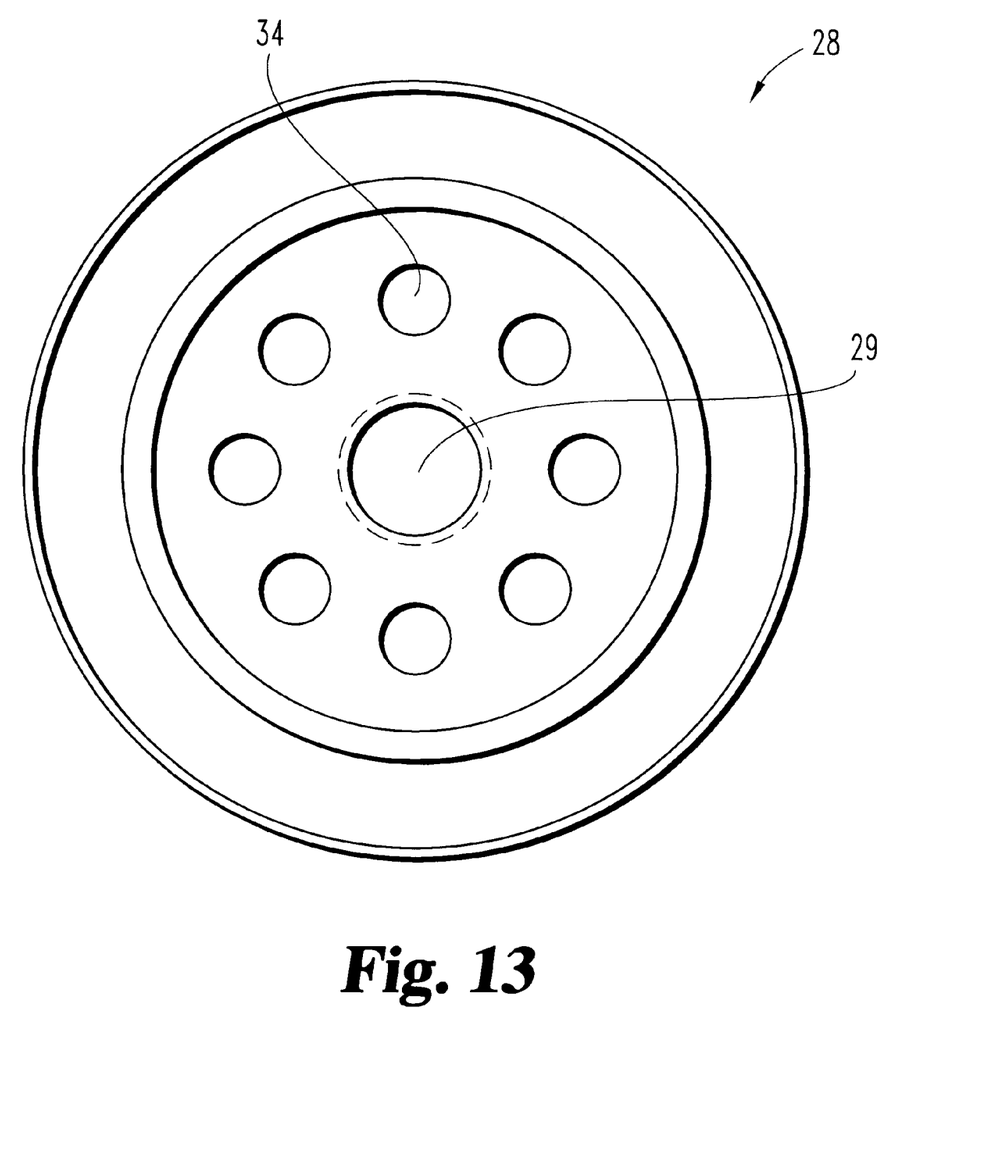
FIG. 13 is a top plan view of a coolant filter comprising a portion of the FIG. 1 fuel cooler and coolant filter assembly.

Referring to FIGS. 1–7, a fuel cooler and coolant filter assembly 20 according to the present invention is illustrated. Assembly 20 includes as its primary or main components filter head assembly 21, a fuel cooler core 22, and a corrosion resistor element 23. The fuel cooler core 22 is designed to be a separable component and is assembled to the filter head assembly 21. The core-to-head interface is sealed by O-ring 24 (see FIG. 4). The filter head assembly 21 includes a filter head 25 constructed as a unitary casting which includes a series of flow passages as will be described hereinafter. The corrosion resistor element 23 is arranged as a water filter canister containing a supply of a supplemental coolant additive (SCA). The nutplate 28 of the filter canister (see FIG. 13) includes an internally threaded aperture 29. The filter head assembly 21 includes an externally threaded male adapter 30 and a mounting interface surface 31.

The corrosion resistor element 23 is threaded onto adapter 30 and threaded advancement draws the top surface of the nutplate 28 up against interface surface 31. A sealing gasket (not illustrated) may be used to enhance the sealed nature of this interface. Adapter 30 is hollow and provides an outlet flow aperture for the coolant (or water) which is filtered by the filtering media disposed inside of outer shell 33. A series of smaller apertures 34 located in the nutplate 28 provide the entrance path for the circulating flow of coolant (see FIG. 13).

Figure 1:
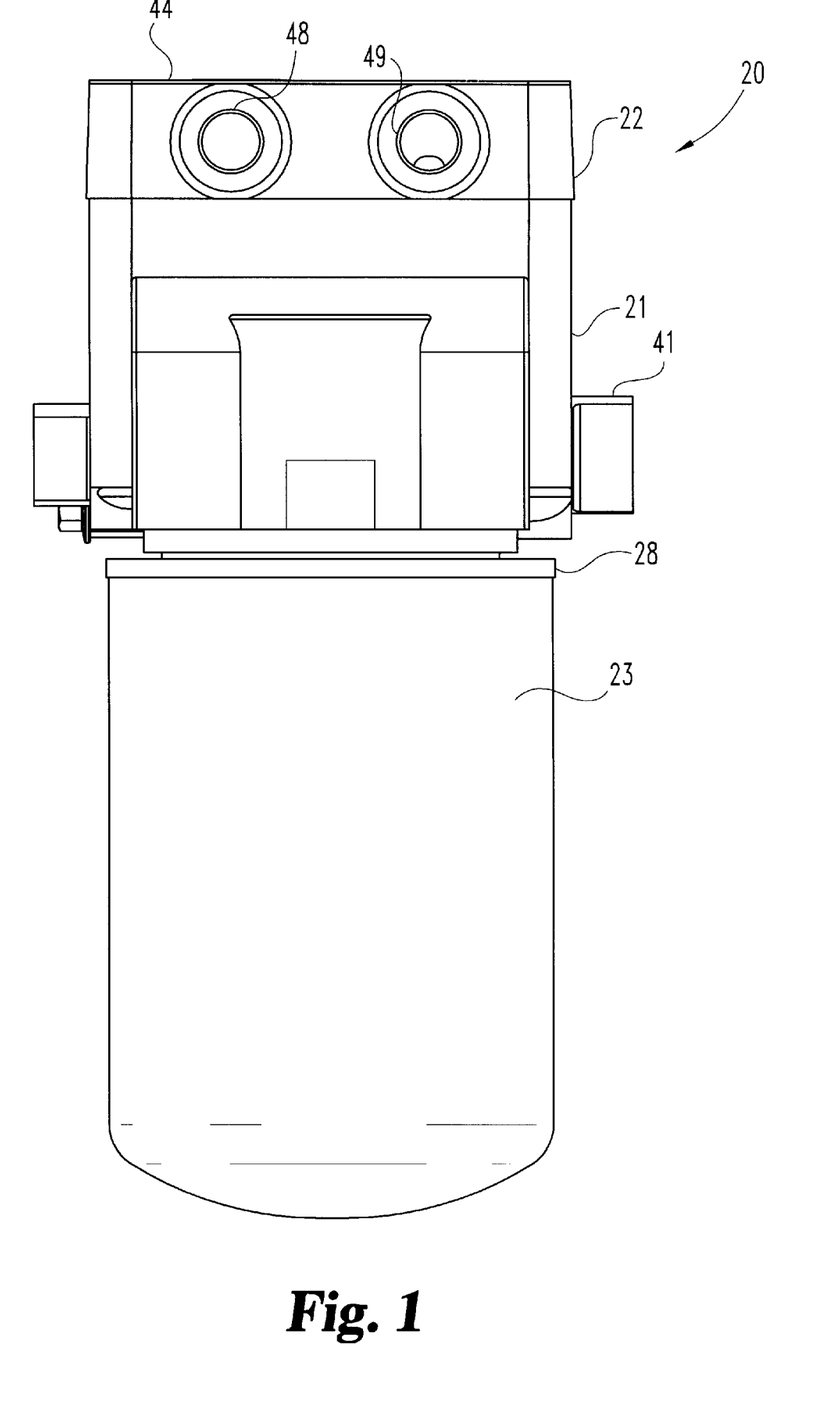
FIG. 1 is a front elevational view of a fuel cooler and coolant filter assembly according to a typical embodiment of the present invention.
Figure 2:
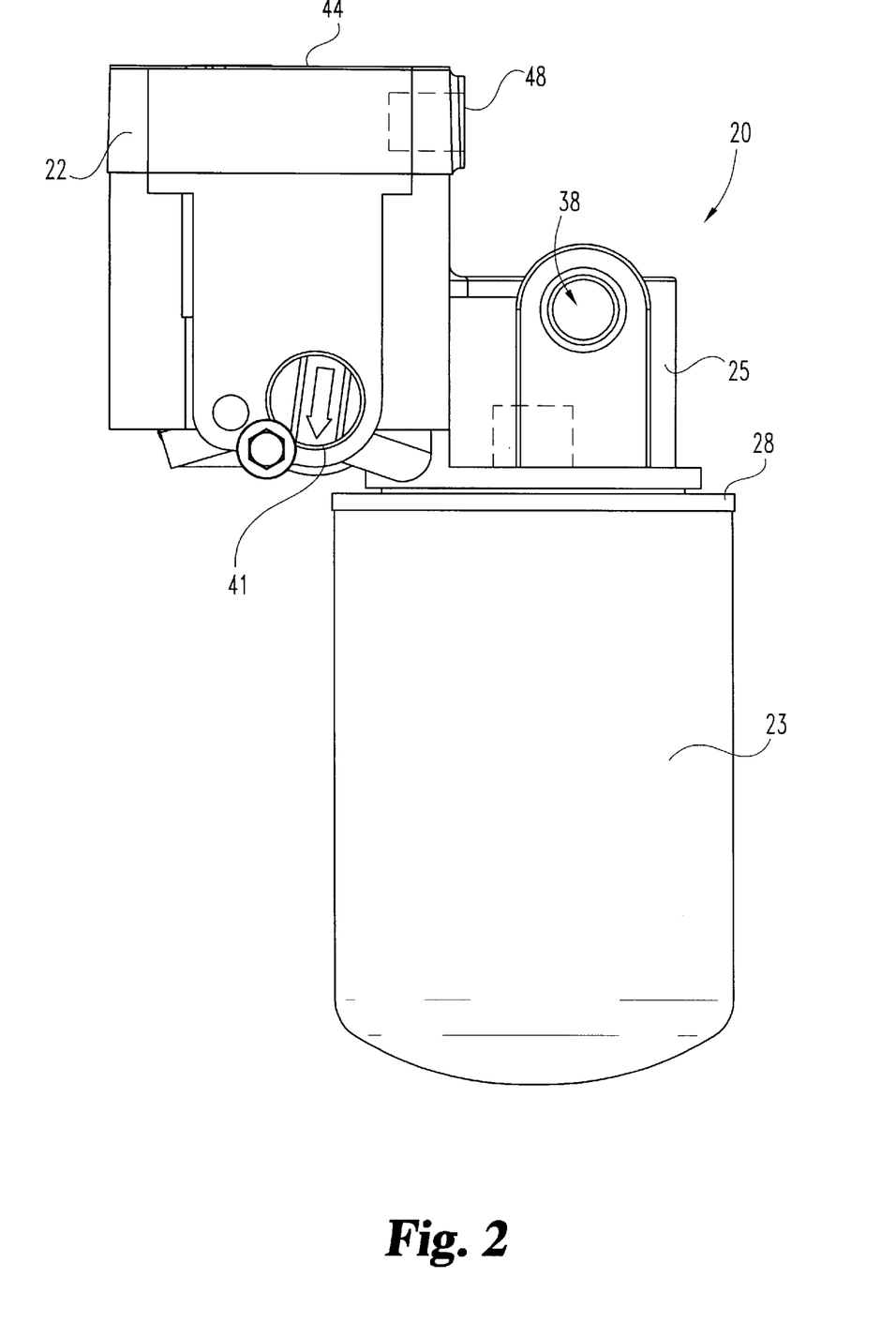
FIG. 2 is a left side elevational view of the FIG. 1 fuel cooler and coolant filter assembly.
Figure 3:
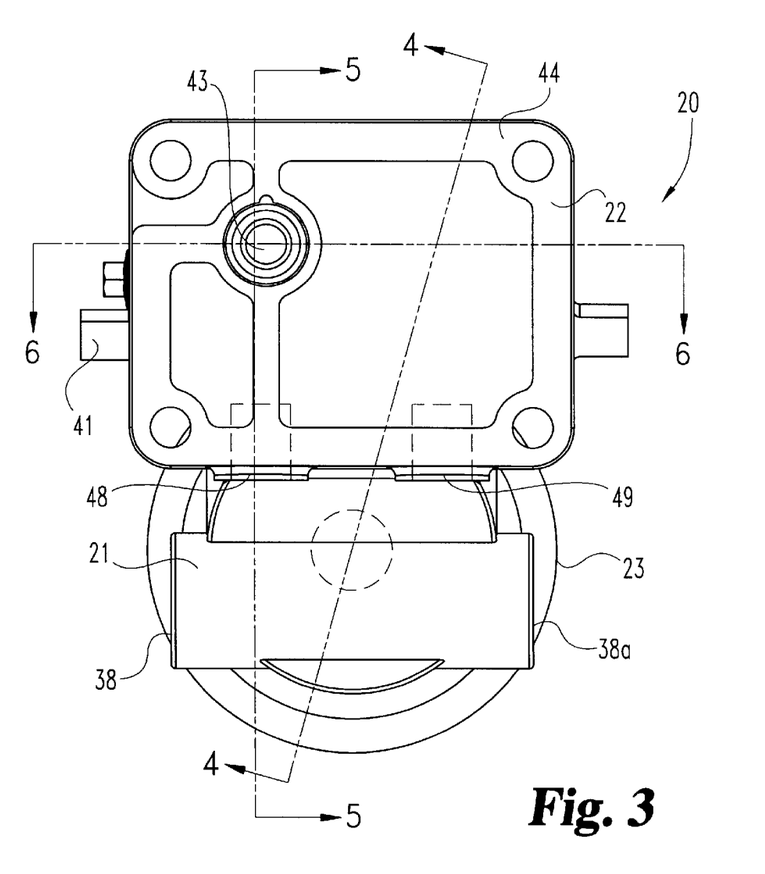
FIG. 3 is a top plan view of the FIG. 1 fuel cooler and coolant filter assembly.
Figure 4:
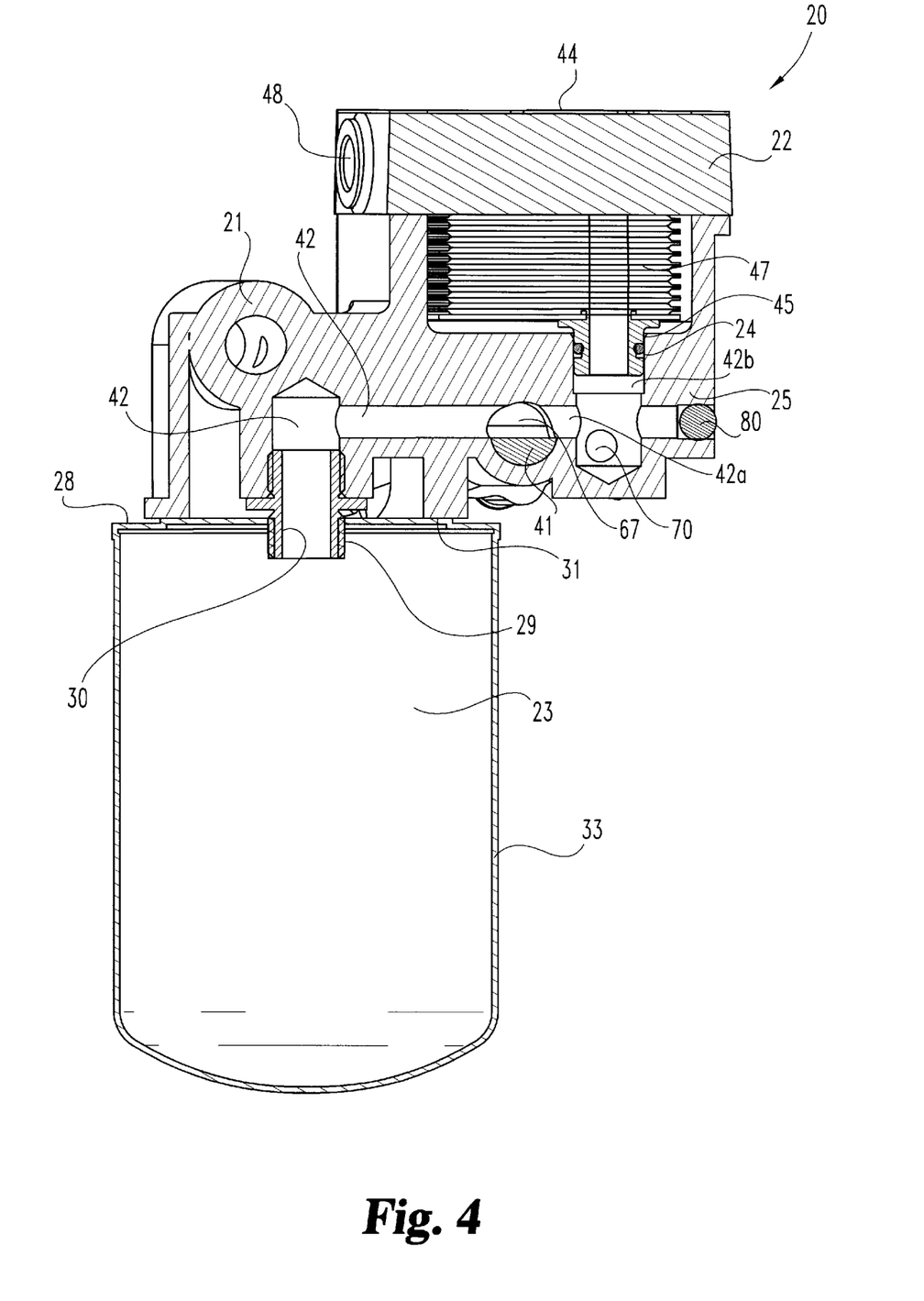
FIG. 4 is a left side elevational view in full section of the FIG. 1 fuel cooler and coolant filter assembly as viewed along line 4—4 in FIG. 3, in the direction of the arrows.
Figure 5:
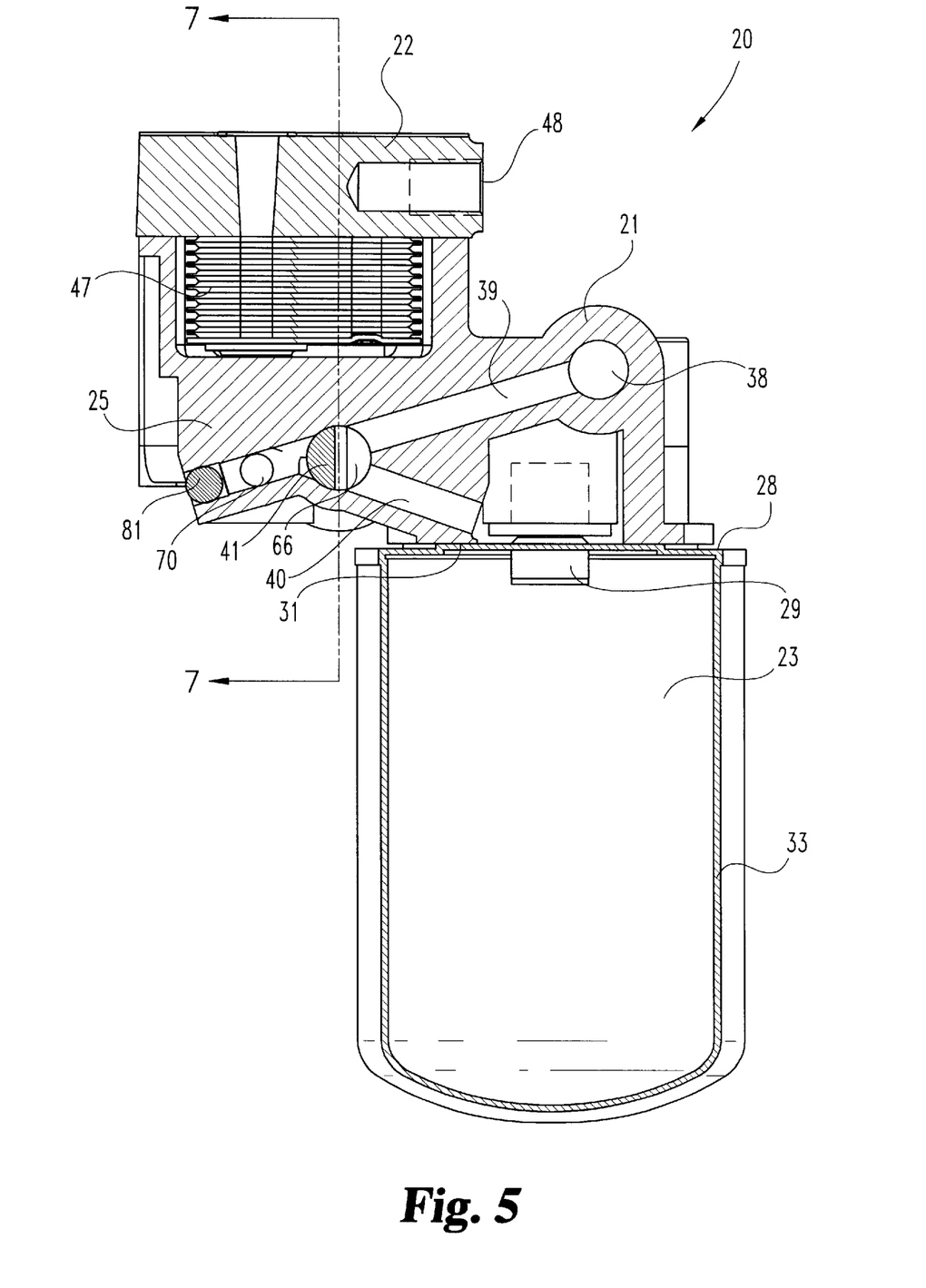
FIG. 5 is a right side elevational view in full section of the FIG. 1 fuel cooler and coolant filter assembly as viewed along line 5—5 in FIG. 3, in the direction of the arrows.
Figure 6:
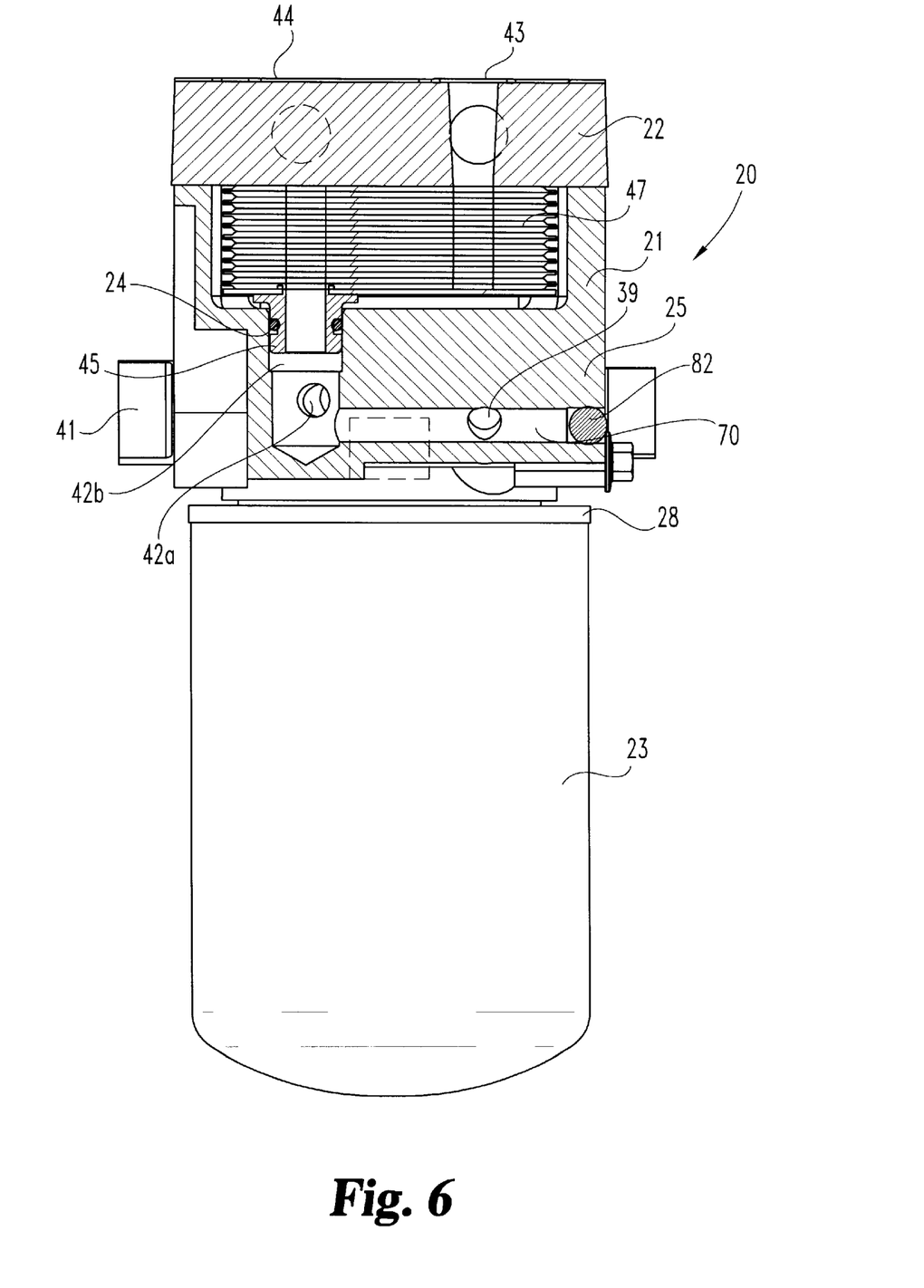
FIG. 6 is a rear elevational view in full section of the FIG. 1 fuel cooler and coolant filter assembly as viewed along line 6—6 in FIG. 3, in the direction of the arrows.
Figure 7:
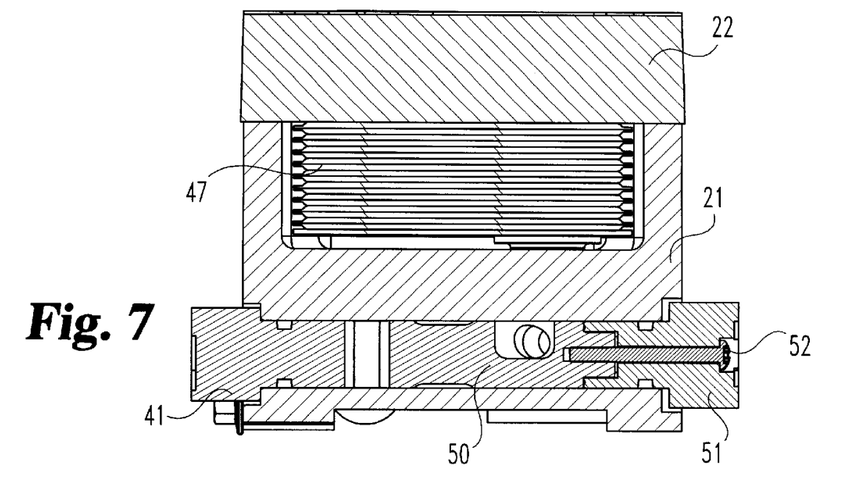
FIG. 7 is a front elevational view in full section of the FIG. 1 fuel cooler and coolant filter assembly as viewed along line 7—7 in FIG. 5, in the direction of the arrows.

The flow of coolant/water enters the "water in" port 38 which is formed as part of filter head 25. The flow path from port 38 to apertures 34 includes two passageways 39 and 40 and a two-piece shut off valve 41. Shut off valve 41 is assembled into filter head 25 and constitutes one of the primary components of the filter head assembly 21. If the shut off valve is in an open condition as illustrated in FIG. 5, water will be allowed to flow to the corrosion resistor element 23 and circulate therethrough before exiting via aperture 29 and adapter 30. From adapter 30 the water flows back into and through filter head 25 by way of passageway 42, through valve 41, and by way of passageway 42a through the remainder of filter head 25 before exiting by way of passageway 42b. The exiting flow goes into the heat exchanger portion of the fuel cooler core 22 by way of cylindrical inlet adapter 45 which is sealed by O-ring 24. The water then circulates through the fuel cooler core 22 and exits via outlet 43. Outlet 43 is in flow communication with the cylinder head. Assembly 20 is attached to the cylinder head by means of four cap screws (not shown). The assembly 20 is sealed to the cylinder head by means of a rubber edge molded gasket (not illustrated). Surface 44 is the interface surface of the core 22 which is sealed against the cylinder head.

The fuel cooler core 22 includes a heat exchanger 47, a fuel inlet 48, and a fuel outlet 49. The fuel circulates over and around the exterior surfaces of the heat exchanger 47 flowing from the inlet to the outlet. The water or coolant from the filter head flows through the interior of the heat exchanger 47 in order to effect the desired heat transfer from the cooler water to the warmer fuel. Since the fuel cooler core to filter head interface is sealed by a face gasket (not illustrated) and by O-ring 24, there is no leakage of the fuel such that all entering fuel is able to exit from the fuel cooler core 22. If the fuel cooler core is not required for a particular design or installation, the core 22 can be removed from the filter head assembly 21. In this arrangement, the filter head assembly is then bolted directly to the cylinder head with a similar face gasket positioned between the two sealing surfaces and the use of four (shorter) cap screws.

Figures 8, 9:
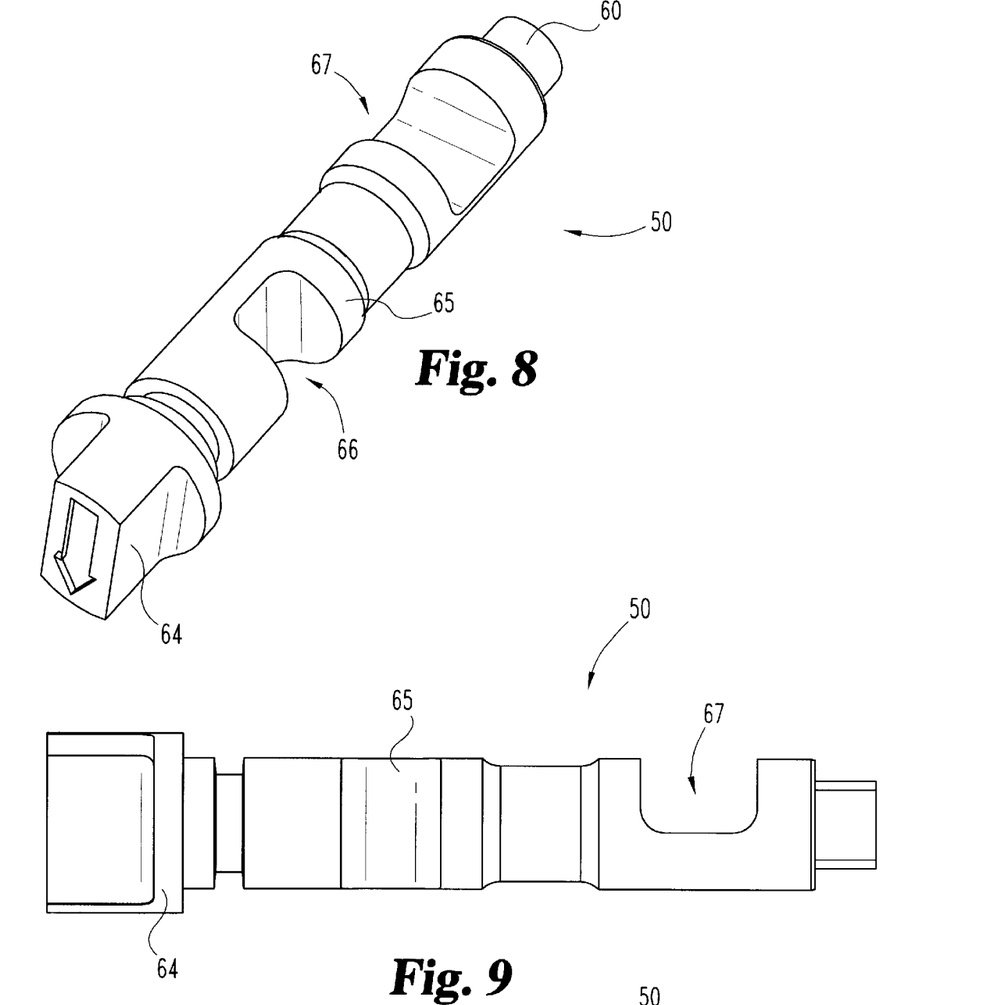
FIG. 8 is a perspective view of a shut off valve shaft comprising a portion of the FIG. 1 fuel cooler and coolant filter assembly.
FIG. 9 is a front elevational view of the FIG. 8 shut off valve shaft.
Figure 10:
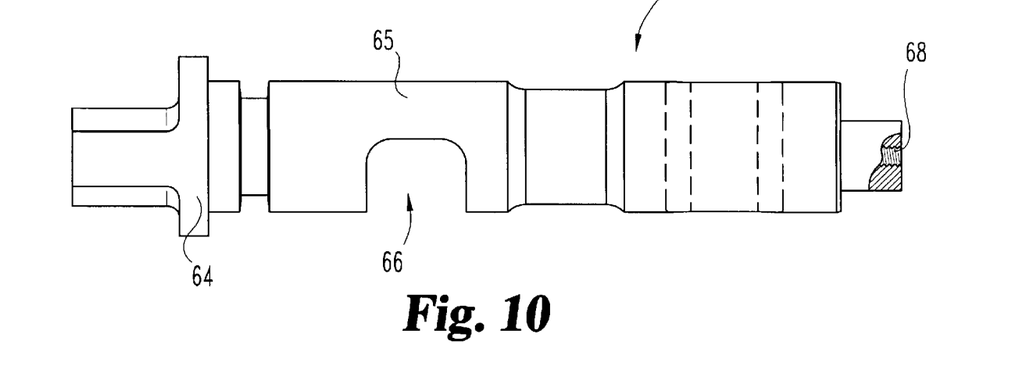
FIG. 10 is a top plan view of the FIG. 8 shut off valve shaft.
Figure 11:
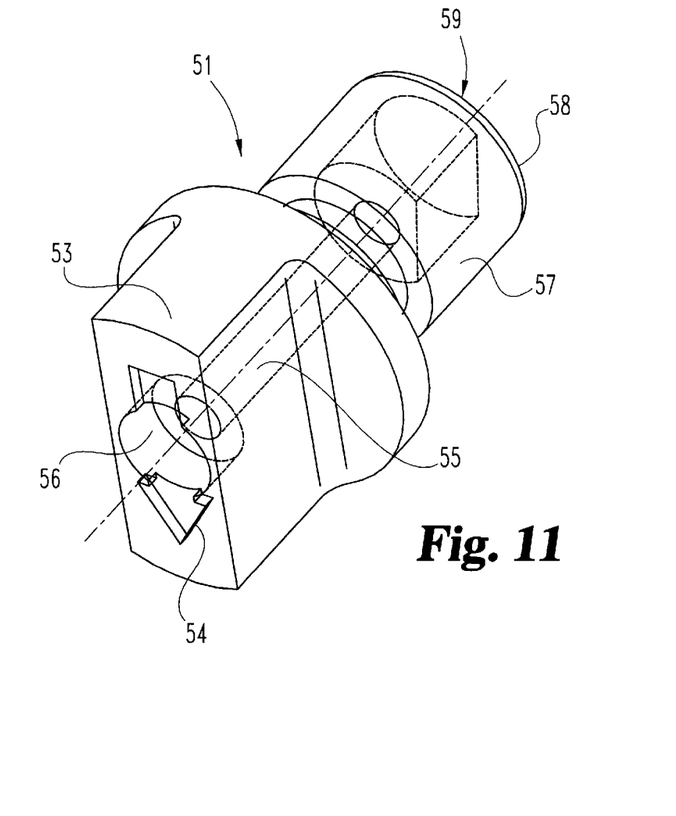
FIG. 11 is a perspective view of a shut off valve control knob designed to assemble to the FIG. 8 shut off valve shaft.
Figure 12:
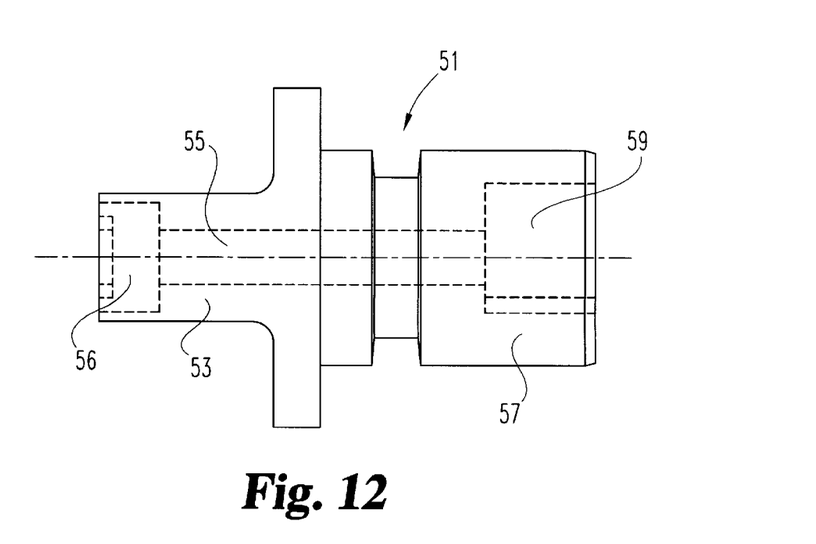
FIG. 12 is a top plan view of the FIG. 11 shut off valve control knob.

The filter head 25 is a unitary casting which receives valve 41 and related components in order to achieve the assembly and sealing aspects required for cooperation with the fuel cooler core 22 and the corrosion resistor element 23. Shut off valve 41 (see FIGS. 8–12) is designed with two primary components including a shut off valve shaft 50 and a shut off valve control knob 51. In effect, items 50 and 51 are both shafts and could be thought of in terms of longer shaft 50 and shorter shaft 51. These two shafts 50 and 51 are axially joined together by screw 52. The longer shaft 50 is illustrated in FIGS. 8–10 and the shorter shaft 51 or control knob is illustrated in FIGS. 11 and 12.

The shorter shaft 51 includes a valve knob 53 which includes an arrow indicator 54 and a clearance hole 55 for receipt of screw 52. Counterbore area 56 receives the head of screw 52. The body 57 of shaft 51 extends into the unitary casting of filter head 21. End 58 is configured with a D-shaped bore 59 which is designed to receive the D-shaped stem 60 of the longer shaft 50.

The longer shaft 50 includes a valve knob 64 and a body 65 with two spaced-apart flow notches 66 and 67. Notches 66 and 67 are rotated 90 degrees apart such that when one notch permits cross flow therethrough in a first direction, the other notch permits cross flow therethrough in a second direction. The first and second directions are perpendicular to each other. Water flows in via inlet tap 38 and from there through passageway 39 and through notch 66 of valve 41 into element 23 via passageway 40. After the water is filtered within element 23, it exits via adapter 30 into passageway 42 and through notch 67 in valve 41, through passageway 42a and from there into the cooler core 22 via passageway 42b and adapter 45. The water circulates through the heat exchanger 47 which is assembled into the cooler core and returns into the cylinder head via outlet 43. Stem 60 has a D-shape for fitting into the D-shaped bore 59 of shorter shaft 51. The internally threaded hole 68 receives screw 52 so as to anchor the two shafts together axially. Rotation of either valve knob 53 or 64 is able to turn the two shafts of valve 41, due to the interlock of the D-shaped stem 60 in the D-shaped bore 59. The rotary position of valve 41 determines what flow paths are open and what flow paths are blocked. With valve 41 in the closed position (a 90° turn from what is illustrated), passageways 40 and 42 (to and from the element 23) are blocked (as are passageways 39 and 42a) so that the element 23 can be unscrewed and removed without any loss of water from the fuel cooler core 22 or from the cylinder head.

Further, when shut off valve 41 is in the closed position, the flow of incoming water is re-routed from passageway 39 through by-pass passageway 70 into passageway 42b and from there into the cooler core 22. This structural arrangement ensures that there will be water flow (or coolant) through the core at all times, even when the corrosion resistor element 23 is being changed. The design of valve 41 allows access from either side of the assembly 20. As will be appreciated, the filter head assembly includes a left side exterior surface and oppositely thereto a right side exterior surface. As illustrated, the shut off valve 41 extends through the body of the filter head 25 and the ends of valve 41 extend outwardly beyond the corresponding side surfaces. This allows the shut off valve to be manually manipulated and turned from either side of the filter head assembly 21.

When the shut off valve 41 is in the open position, water is able to enter the filter head by way of the external supply line through inlet tap 38. As is illustrated, there are actually two inlet taps provided, 38 and 38a, one on each side of filter head 25, for ease of making the required plumbing connections. A decision is made as to which inlet tap 38 or 38a is to be used and then the non-used or non-selected inlet tap is simply plugged closed at final installation.

In order to create the desired passageways in the filter head 25, the drilling procedure creates open ends which are not functional. For example, in FIG. 4, passageways 42 and 42a, which are actually created by the same drilled bore, must be created by drilling in from the rear surface of the filter head. Since the short passageway illustrated to the right of passageway 42b is not functional, it must be plugged so that there is no leakage of any liquid to the exterior. A similar situation exists with regard to the drilled bores that create passageway 39 and bypass passageway 70. In order to plug the open ends of each of these drilled bores, a corresponding steel ball 80, 81, and 82 is pressed into the drilled end of each bore and staked to ensure that the balls do not come out.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fuel cooler and coolant filter assembly for connection to a cylinder head of a vehicle engine for filtering coolant and the cooling of a fuel flow by said coolant, said assembly comprising:

a filter head assembly constructed and arranged with a first coolant passageway with a first coolant inlet and a first coolant outlet and a second coolant passageway with a second coolant inlet and a second coolant outlet;

a coolant filter connected to said filter head assembly, said first coolant outlet cooperatively arranged with said coolant filter for delivering coolant into said coolant filter and said second coolant inlet cooperatively arranged with said coolant filter for receiving coolant from said coolant filter into said filter head assembly; and a fuel cooler core connected to said filter head assembly and including a fuel inlet, a fuel outlet, and a heat exchanger, said second coolant outlet being cooperatively arranged with said fuel cooler core for delivering coolant to said heat exchanger, said heat exchanger having a flow outlet for said coolant and being positioned within said fuel cooler core whereby fuel flows across said heat exchanger between said fuel inlet and said fuel outlet.

2. The assembly of claim 1 wherein said filter head assembly includes a shut off valve which is constructed and arranged to block coolant flow from said first coolant inlet to said first coolant outlet and to block coolant flow from said second coolant inlet to said second coolant outlet.

3. The assembly of claim 2 wherein said filter head assembly defines a third coolant passageway connecting said first coolant passageway with said second coolant passageway so as to route coolant flow from said first coolant inlet to said second coolant outlet, thereby bypassing said coolant filter.

4. The assembly of claim 3 wherein said coolant filter includes a supply of supplemental coolant additive for introduction into the coolant which is delivered into said coolant filter.

5. The assembly of claim 4 wherein said filter head assembly includes a mounting adapter and said coolant filter includes a connection member for assembly to said mounting adapter so as to attach the coolant filter to the filter head assembly.

6. The assembly of claim 5 wherein said mounting adapter has an open interior region which is constructed and arranged for the flow of coolant from said coolant filter into said filter head assembly.

7. The assembly of claim 6 wherein said filter head assembly includes a first exterior side surface and oppositely disposed relative to said first exterior side surface a second exterior side surface and wherein said shut off valve extends through said filter head assembly so as to be manually accessible from both said first exterior side surface and said second exterior side surface.

8. The assembly of claim 7 wherein said fuel coolant core is constructed and arranged to attach to a cylinder head by means of mounting hardware.

9. The assembly of claim 8 wherein said fuel cooler core is removable and said filter head assembly is constructed and arranged to attach directly to a cylinder head by means of mounting hardware whenever said fuel cooler core is removed from its position between said filter head assembly and said cylinder head.

10. The assembly of claim 3 wherein said filter head assembly includes a first exterior side surface and oppositely disposed relative to said first exterior side surface a second exterior side surface and wherein said shut off valve extends through said filter head assembly so as to be manually accessible from both said first exterior side surface and said second exterior side surface.

11. The assembly of claim 1 wherein said coolant filter includes a supply of supplemental coolant additive for introduction into the coolant which is delivered into said coolant filter.

12. The assembly of claim 11 wherein said filter head assembly includes a mounting adapter and said coolant filter includes a connection member for assembly to said mounting adapter so as to attach the coolant filter to the filter head assembly.

13. The assembly of claim 12 wherein said mounting adapter has an open interior region which is constructed and arranged for the flow of coolant from said coolant filter into said filter head assembly.

14. The assembly of claim 1 wherein said fuel coolant core is constructed and arranged to attach to a cylinder head by means of mounting hardware.

15. The assembly of claim 1 wherein said fuel cooler core is removable and said filter head assembly is constructed and arranged to attach directly to a cylinder head by means of mounting hardware whenever said fuel cooler core is removed from its position between said filter head assembly and said cylinder head.

16. The assembly of claim 1 wherein said filter head assembly includes a mounting adapter and said coolant filter includes a connection member for assembly to said mounting adapter so as to attach the coolant filter to the filter head assembly.

17. A coolant filter assembly for connection to a cylinder head of a vehicle engine for the filtering of coolant, said assembly comprising:

a filter head assembly constructed and arranged with a first coolant passageway with a first coolant inlet and a first coolant outlet, a second coolant passageway with a second coolant inlet and a second coolant outlet and a third coolant passageway connecting said first coolant passageway with said second coolant passageway so as to enable the routing of coolant flow from said first coolant inlet to said second coolant outlet;

a coolant filter connected to said filter head assembly, said first coolant outlet cooperatively arranged with said coolant filter for delivering coolant into said coolant filter and said second coolant inlet cooperatively arranged with said coolant filter for receiving coolant from said coolant filter into said filter head assembly; and a shut off valve included as part of said filter head assembly and being constructed and arranged to be positionable in a blocking position so as to block coolant flow from said first coolant inlet to said first coolant outlet and to block coolant flow from said second coolant inlet to said coolant outlet, when said shut off valve is in said blocking position coolant flow is routed from said first coolant passageway to said second coolant passageway by means of said third coolant passageway, thereby maintaining coolant flow through said filter head assembly while bypassing said coolant filter.

18. The assembly of claim 17 wherein said coolant filter includes a supply of supplemental coolant additive for introduction into the coolant which is delivered into said coolant filter.

19. The assembly of claim 18 wherein said filter head assembly includes a mounting adapter and said coolant filter includes a connection member for assembly to said mounting adapter so as to attach the coolant filter to the filter head assembly.

20. The assembly of claim 19 wherein said mounting adapter has an open interior region which is constructed and arranged for the flow of coolant from said coolant filter into said filter head assembly.

21. The assembly of claim 20 wherein said filter head assembly includes a first exterior side surface and oppositely disposed relative to said first exterior side surface a second exterior side surface and wherein said shut off valve extends through said filter head assembly so as to be manually accessible from both said first exterior side surface and said second exterior side surface.

22. The assembly of claim 21 wherein said filter head assembly is constructed and arranged to attach directly to a cylinder head by means of mounting hardware.

23. The assembly of claim 17 wherein said filter head assembly includes a mounting adapter and said coolant filter includes a connection member for assembly to said mounting adapter so as to attach the coolant filter to the filter head assembly.

24. The assembly of claim 17 wherein said filter head assembly is constructed and arranged to attach directly to a cylinder head by means of mounting hardware.

* * * * *